(12) United States Patent
Laurent

(10) Patent No.: US 11,090,979 B2
(45) Date of Patent: Aug. 17, 2021

(54) MOTORBIKE TIRE WITH SPECIFIED CARCASS AND CROWN REINFORCEMENTS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Christophe Laurent, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 314 days.

(21) Appl. No.: 14/893,372

(22) PCT Filed: Jun. 5, 2014

(86) PCT No.: PCT/EP2014/061659
§ 371 (c)(1),
(2) Date: Nov. 23, 2015

(87) PCT Pub. No.: WO2014/198618
PCT Pub. Date: Dec. 18, 2014

(65) Prior Publication Data
US 2016/0101652 A1    Apr. 14, 2016

(30) Foreign Application Priority Data
Jun. 10, 2013 (FR) ........................... 1355325

(51) Int. Cl.
 *B60C 9/06* (2006.01)
 *B60C 9/20* (2006.01)
(Continued)

(52) U.S. Cl.
 CPC .............. *B60C 9/06* (2013.01); *B60C 9/2009* (2013.01); *B60C 11/0008* (2013.01);
(Continued)

(58) Field of Classification Search
 CPC ... B60C 9/06; B60C 15/0045; B60C 2200/10; B60C 15/0036; B60C 15/0009;
(Continued)

(56) References Cited

U.S. PATENT DOCUMENTS 3,244,213 A  4/1966 McMannis
4,042,002 A  8/1977 Alsobrook
(Continued)

FOREIGN PATENT DOCUMENTS

CN  1754709    4/2006
CN  101896366   11/2010
(Continued)

OTHER PUBLICATIONS

English machine translation of JP 4-365601 A, Dec. 17, 1992.*
(Continued)

*Primary Examiner* — Adrienne C. Johnstone
(74) *Attorney, Agent, or Firm* — Cozen O'Connor

(57) ABSTRACT

A tire of the "bias belted" type for a motorbike comprises: a tread (2) connected by two sidewalls (3) to two beads (4). A crown reinforcement (5) is radially on the inside of the tread (2) and comprises at least one crown layer (51, 52), such a crown layer (51, 52) comprising mutually parallel reinforcers. A carcass reinforcement (6) is radially on the inside of the crown reinforcement (5) and comprises at least two carcass layers (61, 62, 63), each comprising mutually parallel reinforcers, and crossed from one carcass layer to the next. The reinforcers of each crown layer (51, 52) form, with the circumferential direction (XX'), an angle between 15° and 25° in the equatorial plane (XZ), and the reinforcers
(Continued)

of each carcass layer (61, 62, 63) form, with the circumferential direction (XX'), an angle between 40° and 50° in the equatorial plane (XZ).

15 Claims, 4 Drawing Sheets

(51) Int. Cl.
    *B60C 15/00*     (2006.01)
    *B60C 11/00*     (2006.01)
    *B60C 13/00*     (2006.01)

(52) U.S. Cl.
    CPC .......... *B60C 13/00* (2013.01); *B60C 15/0009* (2013.01); *B60C 15/0018* (2013.01); *B60C 15/0045* (2013.01); *B60C 2009/2016* (2013.01); *B60C 2011/0025* (2013.01); *B60C 2013/006* (2013.01); *B60C 2200/10* (2013.01)

(58) Field of Classification Search
    CPC ..... B60C 15/00; B60C 2015/009; B60C 9/04; B60C 9/02
    USPC ......................................... 152/554, 559, 558
    See application file for complete search history.

(56) References Cited

U.S. PATENT DOCUMENTS

| | | | | |
|---|---|---|---|---|
| 4,706,724 | A | * | 11/1987 | Ohkuni ..................... 152/554 X |
| 4,706,725 | A | * | 11/1987 | Okuni ................. B60C 15/0045 |
| | | | | 152/554 X |
| 4,773,463 | A | | 9/1988 | Okuni et al. |
| 5,746,852 | A | * | 5/1998 | Watkins |
| 6,397,911 | B1 | * | 6/2002 | Armellin |
| 2004/0250938 | A1 | * | 12/2004 | Matsunami ............... B60C 9/06 |
| | | | | 152/554 X |
| 2008/0190536 | A1 | * | 8/2008 | Aoki |
| 2010/0116391 | A1 | * | 5/2010 | Miyazaki ............ B60C 15/0045 |
| 2011/0005655 | A1 | * | 1/2011 | Imoto ................. B60C 15/0045 |
| 2014/0102608 | A1 | * | 4/2014 | Kato |

FOREIGN PATENT DOCUMENTS

| | | |
|---|---|---|
| CN | 101896367 | 11/2010 |
| DE | 195 16 897 A1 * | 11/1996 |
| DE | 10 2009 0033 400 A1 * | 8/2010 |
| EP | 0 508 813 A1 * | 10/1992 |
| EP | 1 253 024 | 10/2002 |
| EP | 2 423 006 | 2/2012 |
| GB | 2120178 | 11/1983 |
| JP | S 60-240506 | 11/1985 |
| JP | 01306302 A * | 12/1989 |
| JP | 04215502 A * | 8/1992 |
| JP | 04365601 A * | 12/1992 |
| JP | 2004142533 A * | 5/2004 |
| JP | 2011230700 A * | 11/2011 |
| JP | 2013199266 A * | 10/2013 |

OTHER PUBLICATIONS

English machine translation of JP 2004-142533 A, May 20, 2004.*
Office Action (and an English translation) dated Sep. 19, 2016 which issued in the corresponding Chinese Patent Application No. 201480032458.3.

* cited by examiner

MOTORBIKE TIRE WITH SPECIFIED CARCASS AND CROWN REINFORCEMENTS

RELATED APPLICATIONS

This is a U.S. National Stage of International Application No. PCT/EP2014/061659 filed on Jun. 5, 2014. This patent application claims the priority of French application No. 1355325 filed Jun. 10, 2013.

The invention relates to a tire intended to equip a two-wheeled motorized vehicle of the motorbike type.

BACKGROUND OF THE INVENTION

Although not restricted to such an application, the invention will be described more particularly with reference to a tire intended to be mounted at the rear or at the front of a motorbike of the Cruiser type. Compared with a road or sports motorbike, a motorbike of the Cruiser type is characterized by a lower maximum speed, typically at most equal to 180 km/h, by a higher unladen weight, because of the presence of a large cylinder capacity engine and a chrome or metal fairing, and a higher weight in use, because of the load transported in the panniers or the presence of a passenger carried on the back of the motorbike.

Although the speeds are relatively modest, the high-speed stability, which means to say stability at the maximum speed of the motorbike, is one of the most important considerations when designing motorbike tires. This stability needs to be optimized both for straight line, which means to say at zero camber angle, and under cornering, for example for a camber angle of 20°, it being possible for a motorbike of the Cruiser type to reach a maximum camber angle of 30°. By definition, the camber angle is the angle that the mean plane of the motorbike, which means to say the plane of symmetry of the motorbike containing the centre of gravity of the motorbike, forms with the plane perpendicular to the road and tangential to the path.

In what follows and by convention, circumferential, axial and radial directions respectively denote a direction tangential to the tread surface of the tire in the direction of rotation of the tire, a direction parallel to the axis of rotation of the tire and a direction perpendicular to the axis of rotation of the tire. "Radially on the inside or, respectively, radially on the outside of" means "respectively closer to or further away from the axis of rotation of the tire". "Axially on the inside or, respectively axially on the outside of" means "respectively closer to or further away from the equatorial plane of the tire", the equatorial plane of the tire being the plane passing through the middle of the tread surface of the tire and perpendicular to the axis of rotation of the tire. The angles with respect to the circumferential direction which are mentioned in what follows are not oriented and are given in terms of absolute value.

A tire conventionally comprises a tread intended to come into contact with the ground via a tread surface and connected by two sidewalls to two beads, these beads providing the mechanical connection between the tire and the rim on which it is mounted.

Furthermore, a tire comprises a reinforcement, comprising at least one carcass reinforcement radially on the inside of the tread.

The carcass reinforcement of a tire for a motorbike of the Cruiser type is generally made up of at least two carcass layers. One carcass layer is made up of reinforcers usually made of textile, for example of nylon or of polyester, and coated in a polymeric material of elastomeric type referred to as an elastomeric compound. The reinforcers of a carcass layer are mutually parallel and form, with the circumferential direction, an angle at most equal to 65° at any point from the carcass layer and, in particular at any point on an equatorial portion of the carcass layer, but is symmetric with respect to the equatorial plane and of an axial width at most equal to 0.45 times the axial distance between the two axial ends of the tread surface. The reinforcers of two consecutive carcass layers, which means to say that are in contact with one another, are crossed from one layer to the next, which means to say that they form, with the circumferential direction, angles of opposite sign and usually, although not necessarily, having the same absolute value. A carcass reinforcement made up of carcass layers the reinforcers of which are crossed from one layer to the next making an angle of at most equal to 65° with the circumferential direction is said to be non-radial or to be of the "bias" type. The design of such a tire is then said to be of the "bias" type.

Moreover, a carcass layer may or may not have a turnup.

A carcass layer is said to be turned up when it comprises a main part, connecting the two beads together and is wound, in each bead, from the inside towards the outside of the tire, around the circumferential reinforcer referred to as a bead wire to form a turnup that has a free end. The bead wire is a circumferential reinforcer, usually made of metal and coated in a generally elastomeric or textile material. In the case of a turned up carcass layer, the turnup, in each bead, allows the turned up carcass layer to anchor to the bead wire. The portion of bead wire in contact with the turned up carcass layer contributes, particularly upon inflation, to reacting the tensile forces in the turned up carcass layer, by coupling. Typically a turnup has a free end radially on the outside of the radially innermost point of the bead wire, positioned at a radial distance at most equal to 0.5 times the design section height of the tire as defined by the standards of the European Tire and Rim Technical Organisation or ETRTO.

A carcass layer is said not to have a turn up when it consists only of a main part connecting the two beads to one another, without being wrapped around a bead wire. Typically, a turned-up carcass layer has, in each bead, a free end radially on the outside of the radially innermost point of the bead wire and positioned at a radial distance at most equal to 0.25 times the design section height of the tire as defined by the ETRTO standards. Each of the two end portions of the said non-turned-up carcass layer may be coupled either with the turnup of at least one turned-up carcass layer or with the main part of at least one turned-up carcass layer. Coupling means a region of overlap between the non-turned-up carcass layer and a turned-up carcass layer allowing tensile forces to be reacted in shear.

Furthermore, the reinforcement of a tire for a motorbike of the Cruiser type usually comprises, in addition to a carcass reinforcement of the "bias" type, a crown reinforcement radially on the inside of the tread and radially on the outside of the carcass reinforcement. The design of such a tire is then referred to as "bias belted".

The crown reinforcement of a tire for a motorbike of the Cruiser type generally comprises at least one crown layer consisting of reinforcers usually made of textile material, for example of aramid, of nylon or of polyester, or of glass fibre or possibly of metal, and coated in an elastomeric compound. The reinforcers of a crown layer are mutually parallel and form, with the circumferential direction, an angle at most equal to 30° at any point on the layer, and in particular, at any point on an equatorial portion of the crown layer, symmetric with respect to the equatorial plane and of an axial width at most equal to 0.45 times the axial distance between the two axial ends of the tread surface. The reinforcers of two crown layers that are consecutive, which means to say in contact with one another, are usually crossed from one layer to the next, which means to say form, with the circumferential direction, angles of opposite sign and, usually although not necessarily, with the same absolute value.

A conventional method for manufacturing a tire of the "bias belted" type involves a first, assembly, step during which the carcass reinforcement and the crown reinforcement are laid on a cylindrical form of a diameter substantially equal to that of the bead wires of the tire so as to form the reinforcement. The second, curing, step begins with the shaping of the reinforcement previously obtained, causing it to pass from a cylindrical shape to a toroidal shape. As a result of this shaping, the angle formed by the reinforcers of a carcass layer with the circumferential direction varies along the carcass layer between each bead wire and the equatorial plane: for example between 55° at each bead wire and 30° in the equatorial plane. Likewise, the angle formed by the reinforcers of a crown layer, with the circumferential direction, varies along the crown layer between the axial ends and the middle of the crown layer.

As far as the tread radially on the outside of the crown reinforcement is concerned, the material of which it is made is an elastomeric compound. An elastomeric compound is mechanically characterized, after curing, by tensile stress—strain characteristics that are determined by tensile testing. This tensile testing is carried out on a test specimen, to a known method, for example in accordance with international standard ISO 37, and under normal temperature (23° C.+ or -2° C.) and moisture (50%+ or -5% relative humidity) conditions defined by international standard ISO 471. The elastic modulus at 10% elongation of an elastomeric compound, expressed in mega pascals (MPa) is the name given to the tensile stress measured for a 10% elongation of the test specimen. An elastic modulus at 10% elongation of an elastomeric compound is conventionally determined at 23° C., but may also be determined at other temperatures, such as 100° C. for example, in order to take into account how this modulus changes with temperature. By way of example, the elastic modulus at 10% elongation of an elastomeric compound for the tread of a tire for a motorbike of the Cruiser type is approximately equal to 5 MPa at 23° C. and to 3.8 MPa at 100° C.

Document JP 4365601 describes a tire for a motorbike of the "bias belted" type, that has improved stability in a straight line and in a curve. The carcass reinforcement comprises two or three turned-up carcass layers the textile reinforcers of which form with the equator of the tire, which means to say with the circumferential direction, an angle of between 40° and 70°. The crown reinforcement comprises two or three crown layers of which the textile reinforcers form with the equator of the tire, which means to say with the circumferential direction, an angle of between 11° and 25°. Furthermore, the height of the apex, contained within each bead of the tire, is between 0.15 and 0.6 times the design section height of the tire. Finally, the elastomeric compound of the sidewalls have hardnesses that are lower than that of the elastomeric compound of the tread.

SUMMARY OF THE INVENTION

One object of the present invention is to provide a tire of the "bias belted" type for a motorbike that makes it possible to guarantee satisfactory motorbike stability both in a straight line at high speed and zero camber angle and in a curved path with a high camber angle that may be as high as 30°.

This object has been achieved, according to one aspect of the invention, by a tire for a two-wheeled motorized vehicle of the motorbike type, comprising:

a tread connected by two sidewalls to two beads, a crown reinforcement radially on the inside of the tread and comprising at least one crown layer, a crown layer comprising mutually parallel reinforcers forming, with the circumferential direction, an angle at most equal to 30° in the equatorial plane, a carcass reinforcement radially on the inside of the crown reinforcement and comprising at least two carcass layers, each carcass layer comprising mutually parallel reinforcers forming, with the circumferential direction, an angle at most equal to 65° in the equatorial plane, and crossed from one carcass layer to the next, the reinforcers of each crown layer forming, with the circumferential direction, an angle at least equal to 15° and at most equal to 25° in the equatorial plane and the reinforcers of each carcass layer forming, with the circumferential direction, an angle at least equal to 40° and at most equal to 50° in the equatorial plane.

The combination of respective angles of the crown layer and carcass layer reinforcers, according to an embodiment of the invention, makes it possible to maximize the lateral stiffness of the tire as a function of cornering stiffness. The lateral stiffness of a tire, expressed in daN/mm, corresponds to the lateral or axial force, which means to say the force applied to the tire in the axial direction of the tire, that allows an axial movement of a tire equal to 1 mm to be obtained. The cornering stiffness of a tire, expressed in daN/°, corresponds to the lateral or axial force, which means to say the force applied to the tire in the axial direction of the tire, that allows a cornering angle, which means to say an angle of rotation about the radial direction of the tire, of 1° to be obtained. It is known that the straight-line and cornering stability of a motorbike is better if the respective lateral and cornering stiffnesses of the tires are high.

For a given crown layer reinforcer angle, the inventors have determined, for various carcass layer reinforcer angles, the lateral stiffness of the tire as a function of the cornering stiffness thereof. They have demonstrated that the lateral stiffness, dependent on the cornering stiffness, increases, passes through a maximum and then decreases. From this they have deduced the combination of optimum angular ranges for the crown layer reinforcers and carcass layer reinforcers that make it possible to maximize lateral stiffness as a function of cornering stiffness. In this way they have demonstrated that the angular ranges of [15°, 25°] for the crown layer reinforcers and [40°, 50°] for the carcass layer reinforcers respectively make it possible to achieve the optimum levels of lateral stiffness and cornering stiffness, guaranteeing the motorbike satisfactory stability in a straight line and under cornering.

For preference, the angular ranges for the crown layer reinforcers and the carcass layer reinforcers are respectively [16°, 22°] and [45°, 50°].

According to one preferred embodiment, the angle of the reinforcers of any crown layer is constant over the entire axial width of the crown layer. The axial width of a crown layer is the axial distance between the axial ends of the crown layer. An angle that is constant means an angle that does not vary by more than 4° between the middle of the crown layer, situated in the equatorial plane, and each axial end of the crown layer. This constancy of the angle of the crown layer reinforcers makes it possible to optimize the contribution made by the crown layer to the lateral stiffness and cornering stiffness.

Obtaining such a constant angle of the crown layer reinforcers is guaranteed by a method of manufacturing the tire whereby the crown layers are placed, radially on the outside of the carcass reinforcement, when the carcass reinforcement is already at its toroidal shape, so as to avoid any variation in angle during the shaping process. In other words, the crown layers are laid not during a first step of laying on a cylindrical form but during a second step of lying on a toroidal form. The use of such a laying method said to be "two-stage" because the reinforcement is laid in two steps, a first step of lying the carcass reinforcement on a cylindrical form followed by a second step of laying the crown reinforcement on a toroidal form, is not usual for a tire of the "bias belted" type. Indeed, this "two-stage" method is a usual method for the manufacture of a radial tire in which the carcass layer reinforcers form, with the circumferential direction, an angle of between 65° and 90°. In such a "two-stage" method only the carcass layers are shaped during the passage from the cylindrical shape to the toroidal shape, the crown layers being laid later directly onto the toroidal shape.

The crown reinforcement more preferably comprises at least two crown layers of which the respective reinforcers are crossed from one crown layer to the next. Indeed one single crown layer generally does not make it possible to achieve the circumferential stiffness required for the crown reinforcement, given that the type of reinforcers used are usually textile.

For a crown reinforcement comprising at least two crown layers, the respective reinforcers of two successive crown layers are advantageously crossed from one crown layer to the next forming, with the circumferential direction angles that are equal in terms of absolute value. In other words, these angles are opposite angles. This design allows the crown reinforcement a symmetric mechanical operation particularly if the reinforcers are identical between the two crown layers. If the reinforcers are different, in particular made of different materials, it may be advantageous to have angles that are distinct in terms of absolute value.

For preference, the reinforcers of crown layer are made of textile, preferably of aromatic polyamide or of aliphatic polyamide or of polyester. Aromatic polyamides are usually referred to as aramid and aliphatic polyamides are usually referred to as nylon. This type of material is usually used for crown layer reinforcers of a tire for motorbikes because it offers a good compromise between endurance and cost of manufacture.

More preferably still, the reinforcers of crown layer are made of polyester, which is the material that offers the best compromise between endurance and cost of manufacture.

According to an alternative form of embodiment, the reinforcers of at least a first crown layer are made of polyester and the reinforcers of at least a second crown layer are made of aromatic polyamide. This is because use of polyester alone for the crown layer reinforcers may prove insufficient for obtaining sufficient crown reinforcement circumferential stiffness. As a result, it may be advantageous to combine the use of polyester for the reinforcers of a first crown layer with that of an aromatic polyamide, such as aramid, which has an appreciably higher elastic modulus in tension for the reinforcers of a first crown layer, so as to obtain an advantageous compromise between circumferential stiffness/endurance/cost.

According to a preferred embodiment, the carcass reinforcement comprises at least one turned-up carcass layer wound, in each bead, from the inside towards the outside of the tire around a bead wire to form a turnup comprising a free end. A turned-up carcass layer is satisfactorily anchored to the bead wire by its turn up, guaranteeing it good resistance to unwinding.

According to an alternative form of this preferred embodiment, the carcass reinforcement comprises at least two turned-up carcass layers wound, in each bead, from the inside towards the outside of the tire around a bead wire, in order respectively to form a turnup comprising a free end. This design effectively contributes to the required lateral stiffness, through the presence of two main parts and two turnups of carcass layers in the sidewalls, namely four thicknesses of carcass layer.

According to another preferred embodiment, the turnup of at least one turned-up carcass layer is at least partially in contact with at least one crown layer along a region of overlap comprised between the axial end of the crown layer and the free end of the turnup. This region of overlap makes it possible both to lock the turnup in the crown reinforcement and to increase the respective lateral and cornering stiffness by comparison with a shorter turnup the free end of which is radially on the inside of the axial end of any crown layer. This particular design is said to be of the "shoulder lock" type. This design may refer to the turnup of a single carcass layer, for example the carcass layer axially furthest towards the inside in the sidewalls, or all or part of the carcass layers turnups when the carcass reinforcement comprises at least two turned-up carcass layers.

According to an alternative form that is advantageous from the manufacturing standpoint, the turnup is radially on the inside of the crown layer in the region of overlap.

It is advantageous for the curvilinear width of the region of overlap to be at least equal to 0.2 times the curvilinear half-width of the crown layer. The curvilinear width of the region of overlap corresponds to the curvilinear distance between the axial end of the crown layer and the free end of the turnup. The curvilinear half-width of the crown layer is measured along the curvilinear abscissa of the crown layer between an axial end and the middle of the said crown layer. This minimum value of curvilinear width of the region of overlap guarantees a significant "shoulder lock" effect.

It is more advantageous still for the curvilinear width of the region of overlap to be at most equal to 0.6 times the curvilinear half-width of the crown layer. This maximum value results from a manufacturing constraint: a wider region of overlap is more difficult to manufacture with known manufacturing methods. In addition, this limit on width guarantees that the free end of turn up is positioned axially on the outside of the crown portion corresponding to the area of contact between the tire and the ground at zero camber angle, thereby advantageously limiting the increase in cornering stiffness. For example, the curvilinear width of the region of overlap can be 0.45 times the curvilinear half-width of the crown layer.

In order to achieve maximum lateral stiffness it is preferable for the free end of the turnup of every turned-up carcass layer to be axially on the inside and radially on the outside of the axial end of every crown layer. In other words, the "shoulder lock" design applied to all of the turned-up carcasses of the carcass reinforcement is particularly beneficial.

The reinforcers of carcass layer are advantageously made of textile, preferably of polyester or of nylon, because of the good compromise between endurance and cost of manufacture.

It may also be beneficial for the respective reinforcers of the radially innermost crown layer and of the radially outermost working layer to form, with the circumferential direction, respective angles that have the same sign. This makes it possible to reduce the cornering stiffness for the same level of lateral stiffness.

As far as the tread is concerned, the elastic modulus at 10% elongation of the elastomeric compound of the tread is advantageously at least equal to 6.5 MPa and at most equal to 9 MPa at 23° C., and at least equal to 5 MPa and at most equal to 6 MPa at 100° C. For a conventional elastomeric compound for a tread of a tire of a motorbike of the Cruiser type, the elastic modulus at 10% elongation is approximately equal to 5 MPa at 23° C. and to 3.8 MPa at 100° C. Therefore the elastic modulus of the elastomeric compound of the tread according to the invention is higher, allowing a greater contribution made by the tread to the lateral and cornering stiffnesses of the tire. Such an elastomeric compound therefore makes it possible to increase the respective lateral and cornering stiffnesses of the tire still further.

As far as the sidewalls of the tire are concerned, these connecting the tread to the beads, the elastic modulus at 10% elongation of the elastomeric compound of the sidewalls is at least equal to 8 MPa at 23° C. This level of elastic modulus at 10% elongation of the elastomeric compound of the sidewalls guarantees that the sidewalls make a good contribution to the respective lateral and cornering stiffnesses of the tire. Moreover, the elastic modulus at 10% elongation of the elastomeric compound of the sidewalls is appreciable higher than the elastic modulus at 10% elongation of the elastomeric compound of the tread, at 23° C.

BRIEF DESCRIPTION OF THE DRAWINGS

Other details and advantageous features of the invention will become apparent hereinafter from the description of the invention given with reference to FIGS. 1 to 4 which depict:

In order to make them easier to understand, FIGS. 1 to 4 are not drawn to scale.

DETAILED DESCRIPTION OF THE DRAWINGS

Figure 1:
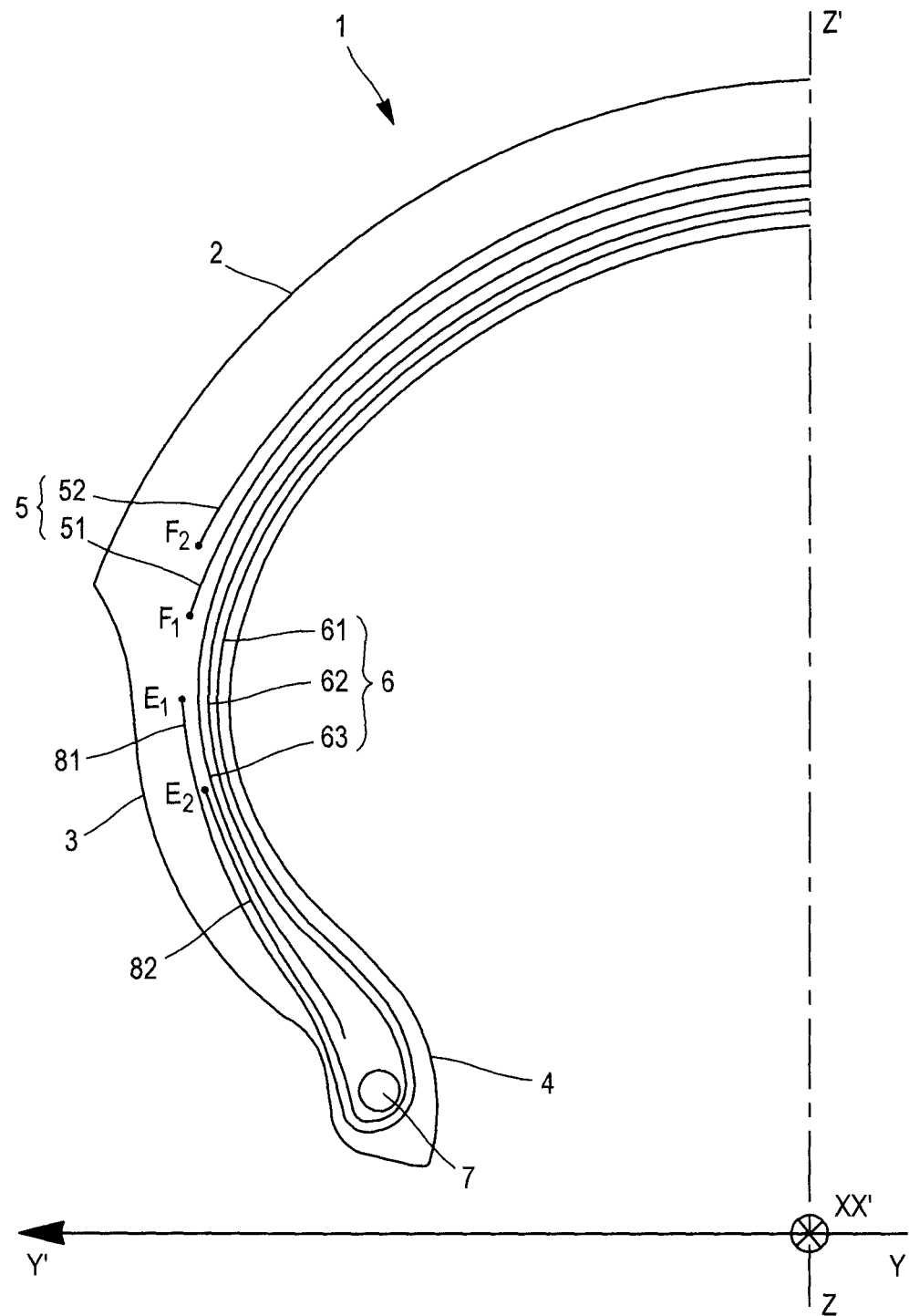
FIG. 1: a meridian section of a tire according to a first embodiment of the invention.

FIG. 1 depicts a meridian half-section of a tire 1 for a motorized two-wheeled vehicle of the motorbike type according to the invention, the section being taken on a meridian plane (YZ) passing through the axis of rotation of the tire of axial direction (YY'), the tire 1 being symmetric about the equatorial plane (XZ) passing through the middle of the tread 2 and perpendicular to the axis of rotation of the tire. In this meridian half-section, the tread 2 is connected by the sidewall 3 to the bead 4. The crown reinforcement 5 radially on the inside of the tread 2 comprises two crown layers (51, 52) having axial ends ($F_1$, $F_2$). The reinforcers of each crown layer (51, 52) form, with the circumferential direction (XX'), an angle at least equal to 15° and at most equal to 25° in the equatorial plane (XZ). The carcass reinforcement 6 radially on the inside of the crown reinforcement 5 comprises three carcass layers (61, 62, 63) of which two are turned-up carcass layers (61, 62) and one is a carcass layer (63) without a turnup. The two turned-up carcass layers (61, 62) are wound around the bead wire (7) to form respective turnups (81, 82) having free ends ($E_1$, $E_2$). The reinforcers of each carcass layer (61, 62, 63) form, with the circumferential direction (XX'), an angle at least equal to 40° and at most equal to 50° in the equatorial plane (XZ).

Figure 2:
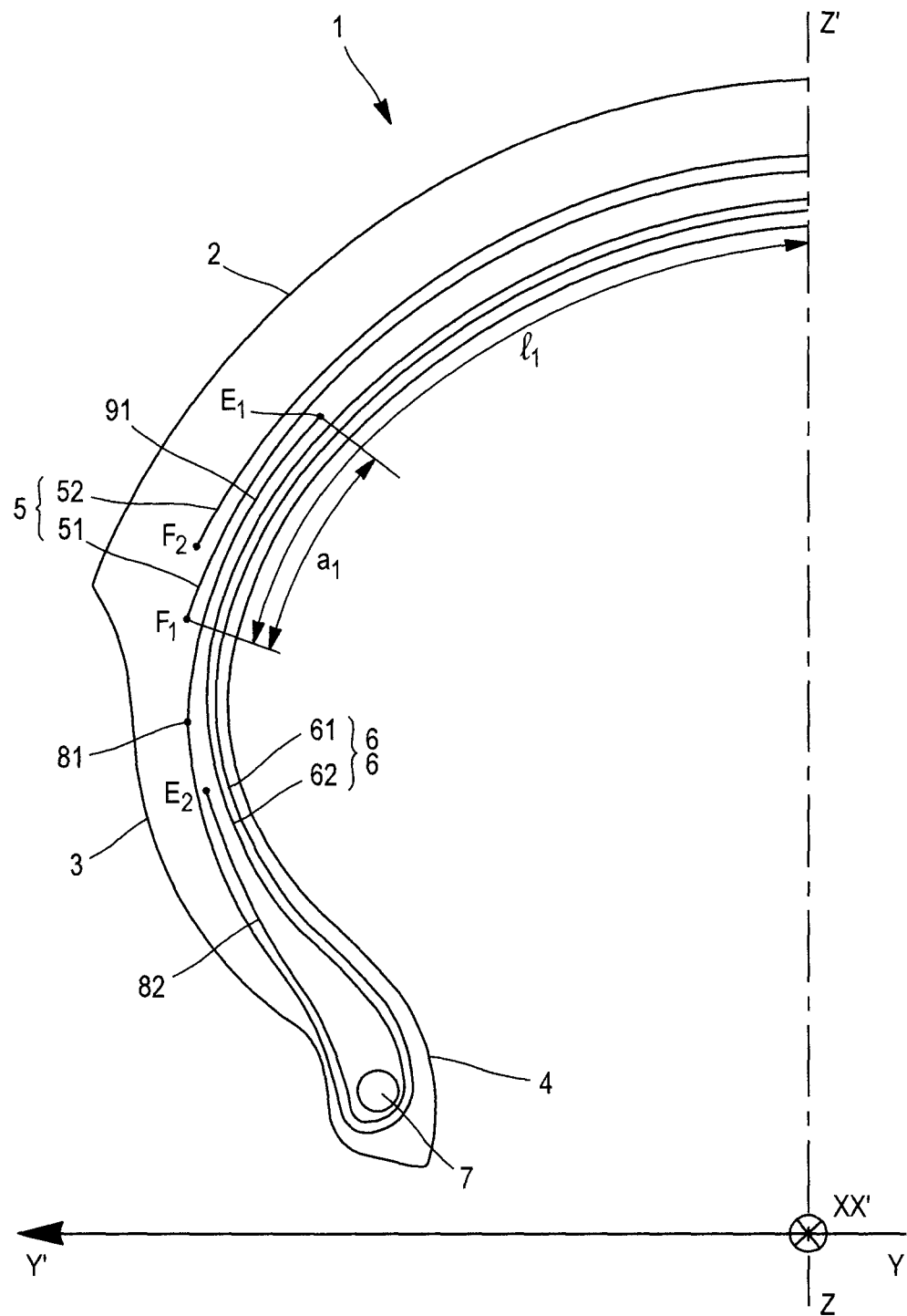
FIG. 2: a meridian section of a tire according to a second embodiment of the invention, of "shoulder lock" type.

FIG. 2 depicts a meridian half-section of a tire 1 for a motorized two-wheeled vehicle of the motorbike type according to the invention, in an embodiment of "shoulder lock" type. In this meridian half-section, the tread 2 is connected by the sidewall 3 to the bead 4. The crown reinforcement 5 radially on the inside of the tread 2 comprises two crown layers (51, 52) having axial ends ($F_1$, $F_2$). The reinforcers of each crown layer (51, 52) form, with the circumferential direction (XX'), an angle at least equal to 15° and at most equal to 25° in the equatorial plane (XZ). The carcass reinforcement 6 radially on the inside of the crown reinforcement 5 comprises two turned-up carcass layers (61, 62) wound around the bead wire 7, to form respective turnups (81, 82) having free ends ($E_1$, $E_2$). The turnup (81) of the turned-up carcass layer (61) axially nearest to the inside in the sidewall (3) is at least partially in contact with the crown layer (51) of curvilinear half-width ($l_1$), along a region of overlap (91), comprised between the axial end ($F_1$) of the crown layer (51) and the free end ($E_1$) of the turnup (81) over a curvilinear width ($a_1$). The ratio $a_1/l_1$ characterizes said overlap. The turnup (82) of the turned-up carcass layer (62) axially furthest towards the outside in the sidewall 3 has its free end ($E_2$) radially on the inside of the axial end ($F_1$) of the crown layer (51). The reinforcers of each carcass layer (61, 62) form, with the circumferential direction (XX'), an angle at least equal to 40° and at most equal to 50° in the equatorial plane (XZ).

Figure 3:
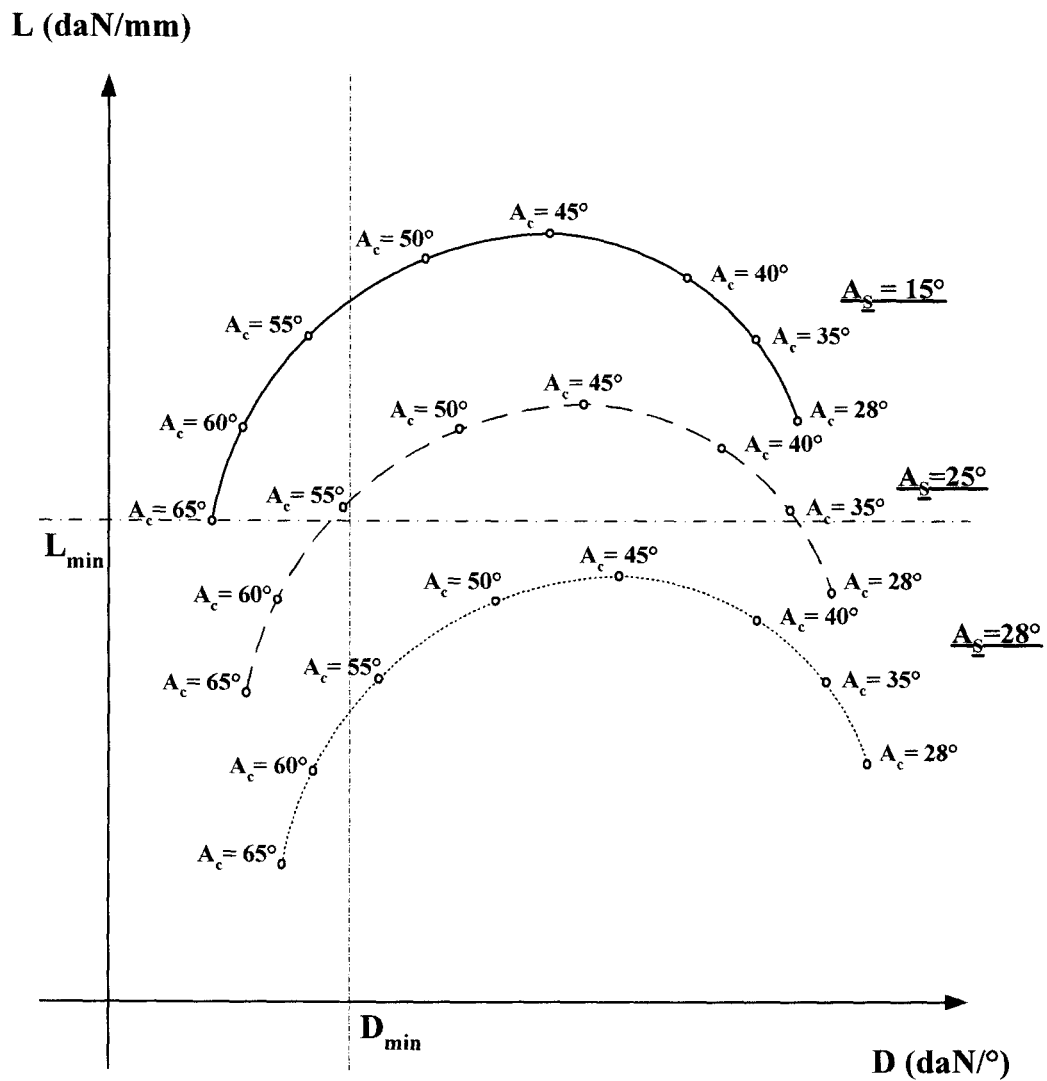
FIG. 3: a graph indicating the change in lateral stiffness of a tire according to the invention as a function of the cornering stiffness thereof, for various angles of crown layer reinforcers and carcass layer reinforcers.

FIG. 3 is a graph indicating the change in lateral stiffness L, expressed in daN/mm, of a tire according to the invention as a function of the cornering stiffness D thereof, expressed in daN/°, for various angles $A_S$ of crown layer reinforcers. More specifically, each curve is determined for a given angle $A_S$ of crown layer reinforcers. Three curves are depicted here, these respectively corresponding to crown layer reinforcer angles $A_S$ of 15°, 22° and 28° respectively. For each crown layer reinforcer angle value $A_S$, the lateral stiffness L and the cornering stiffness D are determined for carcass layer reinforcer angle values $A_C$ able successively to adopt values of 65°, 60°, 55°, 50°, 45°, 40°, 35° and 28°. The curves thus obtained pass through a maximum of lateral stiffness L as a function of cornering stiffness D. The inventors set themselves a minimum cornering stiffness value $D_{min}$ and a minimum lateral stiffness value $L_{min}$ order to determine the optimum value ranges for the angles $A_S$ of the crown layer reinforcers and the angles $A_C$ of the carcass layers, that allow the lateral stiffness L to be maximized for a sufficient cornering stiffness D. This graph shows that the ranges of angles $A_S$ respectively of [15°, 25°], for the crown layer reinforcers, and of angles $A_C$ of [40°, 50°], for the carcass layer reinforcers, make it possible to achieve optimum levels of lateral stiffness L and of cornering stiffness D.

Figure 4:
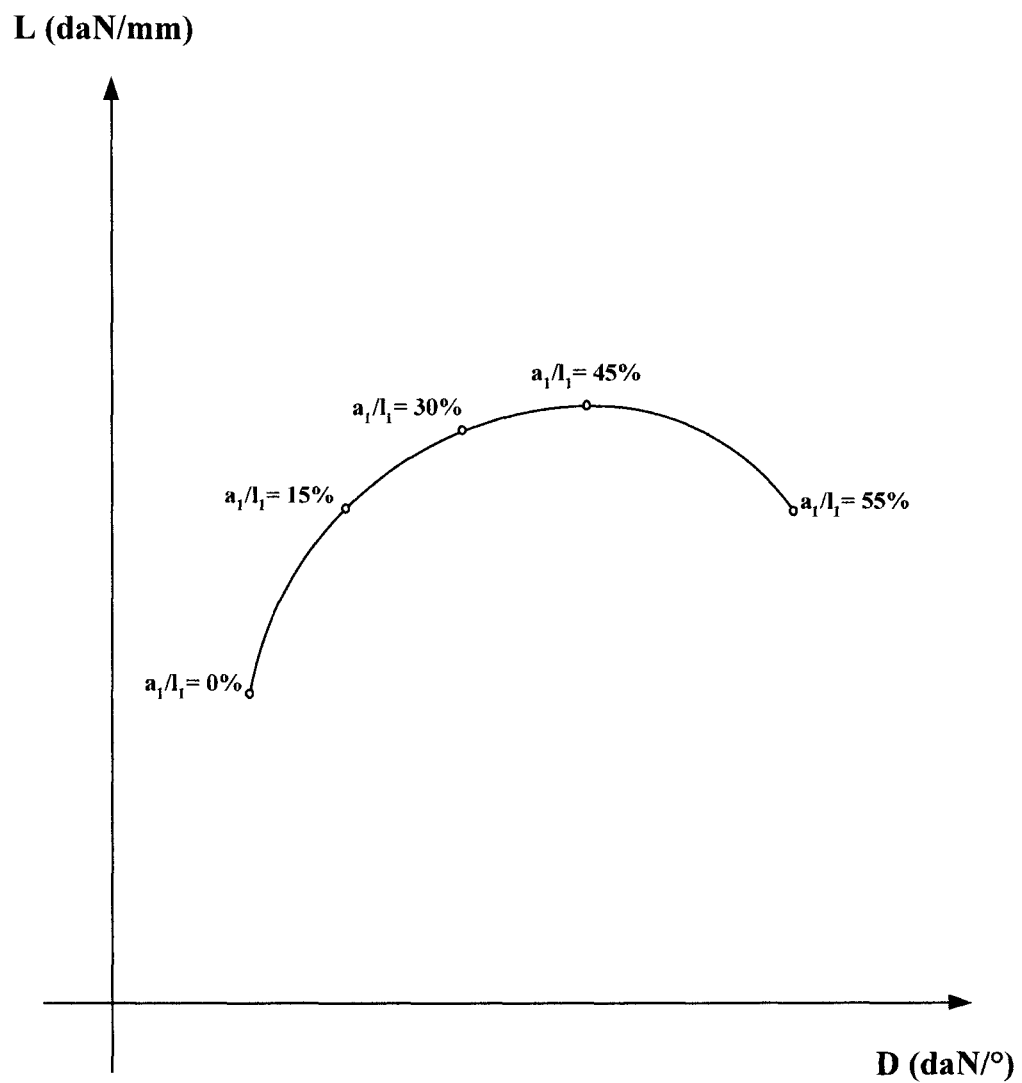
FIG. 4: a graph indicating the change in lateral stiffness of a tire according to the invention as a function of the cornering stiffness thereof, in an embodiment of the "shoulder lock" type, for various values of overlap.

FIG. 4 is a graph indicating how the lateral stiffness L, expressed in daN/mm, of a tire according to the invention in an embodiment of the "shoulder lock" type changes as a function of its cornering stiffness D, expressed in daN/°, for given crown layer and carcass layer reinforcer angles. The variable parameter is the curvilinear width of overlap $a_1$, or, more specifically, the ratio $a_1/l_1$ between the curvilinear width of overlap $a_1$ and the curvilinear half-width $l_1$ of the crown layer 51, as depicted in FIG. 2. The respective lateral L and cornering D stiffnesses are determined for an $a_1/l_1$ ratio that can adopt the values of 0%, 15%, 30%, 45% and 55%. The curve indicated has a maximum lateral stiffness L for an $a_1/l_1$ ratio equal to 45%.

The invention has been devised more particularly for a motorbike tire of size 160/70B17. A reference tire was compared against a tire according to the invention, in an embodiment of "shoulder lock" type as depicted in FIG. 2.

The reference tire comprises a carcass reinforcement with two turned-up carcass layers the polyester reinforcers of which form, with the circumferential direction, an angle of 28° in the equatorial plane. The free end of the turnup of the turned-up carcass that is axially furthest towards the inside in the sidewalls is positioned a radial distance of 50 mm, radially on the outside of the radially innermost point of the bead wire. The free end of the turnup of the turned-up carcass that is axially outermost in the sidewalls is positioned at a radial distance of 42 mm, radially on the outside of the radially innermost point of the bead wire. The crown reinforcement of the reference tire comprises two crown layers the aramid reinforcers of which form, with the circumferential direction, an angle of 28° in the equatorial plane. In this reference design, the lateral stiffness of the tire is equal to 24 daN/mm, whereas the cornering stiffness is equal to 67 daN/°.

The tire according to the invention, in an embodiment of "shoulder lock" type as depicted in FIG. 2, comprises a carcass reinforcement with two turned-up carcass layers the reinforcers of which are made of polyester and form, with the circumferential direction, an angle equal to 45° in the equatorial plane. The free end of the turnup of the turned-up carcass axially furthest towards the inside in the sidewalls is positioned at a radial distance of 76 mm, radially on the outside of the radially innermost point of the bead wire. The region of overlap between this first turnup and the crown layer in contact is equal to 20 mm. The free end of the turnup of the turned-up carcass axially furthest towards the outside in the sidewalls is positioned at a radial distance of 70 mm, radially on the outside of the radially innermost point of the bead wire. There is no region of overlap between this second turnup and a crown layer. The crown reinforcement of the tire according to the invention moreover comprises two crown layers of which the aramid reinforcers form, with the circumferential direction, an angle of 22° that is constant across the axial width of the crown layer. In this design according to the invention, the lateral stiffness of the tire is equal to 27 daN/mm, namely +3 daN/mm in comparison with the reference, whereas the cornering stiffness is equal to 72 daN/°, namely +5 daN/° with respect to the reference.

The invention claimed is:

1. A motorbike tire, comprising:
   a tread connected by two sidewalls to two beads;
   a crown reinforcement radially on the inside of the tread and comprising at least one crown layer;
   each of said at least one crown layer comprising mutually parallel reinforcers forming, with the circumferential direction of the tire, an angle at least equal to 15° and at most equal to 25° in the equatorial plane;
   a carcass reinforcement radially on the inside of the crown reinforcement and comprising at least two carcass layers each connecting the two beads to one another;
   each carcass layer comprising mutually parallel reinforcers forming, with the circumferential direction, an angle at least equal to 40° and at most equal to 50° in the equatorial plane, and crossed from one carcass layer to the next,
   wherein at least two of the at least two carcass layers are turned-up carcass layers wound, in each bead, from the inside towards the outside of the tire around a bead wire to form a turnup comprising a free end,
   wherein a respective radially outermost turnup of the at least two turned-up carcass layers is at least partially in contact with a radially innermost crown layer of the at least one crown layer along the region of overlap between the respective axial end of the radially innermost crown layer and the respective free end of the radially outermost turnup, and
   wherein a curvilinear width of the region of overlap between the respective axial end of the radially innermost crown layer and the respective free end of the radially outermost turnup is at most equal to 0.6 times a curvilinear half-width of the crown layer,
   wherein the curvilinear half-width of the radially innermost crown layer is measured along a curvilinear abscissa of the radially innermost crown layer between the respective axial end and a middle of the said radially innermost crown layer, and
   wherein the free end of the respective turnup of every turned-up carcass layer is axially on the inside and radially on the outside of the respective axial end of every crown layer.

2. The tire according to claim 1, wherein said at least one crown layer has an axial width between its two axial ends in which the angle of the reinforcers thereof is constant over the entire axial width of the crown layer.

3. The tire according to claim 1, wherein the at least one crown layer is at least two crown layers of which the respective reinforcers are crossed from one crown layer to the next.

4. The tire according to claim 3, wherein the respective reinforcers of two successive crown layers are crossed from one crown layer to the next forming, with the circumferential direction angles that are equal in terms of absolute value.

5. The tire according to claim 1, wherein the reinforcers of said at least one crown layer are made of textile.

6. The tire according to claim 1, wherein the reinforcers of said at least one crown layer are made of polyester.

7. The tire according to claim 1, wherein the reinforcers of at least a first of said at least one crown layer are made of polyester and the reinforcers of at least a second of said at least one crown layer are made of aromatic polyamide.

8. The tire according to claim 1, wherein the respective radially outermost turnup is radially on the inside of the radially innermost crown layer in the region of overlap.

9. The tire according to claim 1, wherein the curvilinear width of the region of overlap is at least equal to 0.2 times the curvilinear half-width of the radially innermost crown layer.

10. The tire according to claim 1, wherein the reinforcers of each carcass layer are made of textile.

11. The tire according to claim 1, wherein, the tread being made is of an elastomeric compound, wherein the elastic modulus at 10% elongation of the elastomeric compound of the tread is at least equal to 6.5 MPa and at most equal to 9 MPa at 23° C., and at least equal to 5 MPa and at most equal to 6 MPa at 100° C.

12. The tire according to claim 1, the sidewalls of the tire being made of an elastomeric compound, wherein the elastic modulus at 10% elongation of the elastomeric compound of the sidewalls is at least equal to 8 MPa at 23° C.

13. The tire according to claim 1, wherein the reinforcers of said at least one crown layer are made of aromatic polyamide or of aliphatic polyamide or of polyester.

14. The tire according to claim 1, wherein the reinforcers of each carcass layer are made of polyester or of nylon.

15. The tire according to claim 1, wherein the curvilinear width of the region of overlap is equal to 0.45 times the curvilinear half-width of the radially innermost crown layer.

* * * * *